United States Patent
Guo et al.

(10) Patent No.: US 10,496,144 B2
(45) Date of Patent: Dec. 3, 2019

(54) POWER MANAGEMENT

(71) Applicant: EMC Corporation, Hopkinton, MA (US)

(72) Inventors: Feng Golfen Guo, Shanghai (CN); Grissom Tianqing Wang, Shanghai (CN); Roby Qiyan Chen, Shanghai (CN); Layne Lin Peng, Shanghai (CN); Vivian Yun Zhang, Shanghai (CN); Kay Kai Yan, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/669,896

(22) Filed: Mar. 26, 2015

(65) Prior Publication Data
US 2015/0277525 A1    Oct. 1, 2015

(30) Foreign Application Priority Data
Mar. 28, 2014   (CN) .......................... 2014 1 0135607

(51) Int. Cl.
| | |
|---|---|
| G06F 1/26 | (2006.01) |
| G06F 1/3234 | (2019.01) |
| G06F 1/3206 | (2019.01) |
| G06Q 10/06 | (2012.01) |
| G06Q 50/06 | (2012.01) |

(52) U.S. Cl.
CPC .............. G06F 1/26 (2013.01); G06F 1/3206 (2013.01); G06F 1/3234 (2013.01); G06Q 10/06 (2013.01); G06Q 50/06 (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 6,535,976 B1 * | 3/2003 | Hoggarth | G06F 9/4416 713/1 |
| 6,718,464 B2 * | 4/2004 | Cromer | G06F 9/44505 709/222 |
| 7,321,974 B2 * | 1/2008 | Anderson | G06F 1/3234 713/300 |

(Continued)

OTHER PUBLICATIONS

Tina Sieber, Windows 7 Power Options and Sleep Modes Explained. Nov. 3, 2011.*

(Continued)

*Primary Examiner* — Zahid Choudhury
(74) *Attorney, Agent, or Firm* — Brian J. Colandreo; Mark H. Whittenberger; Holland & Knight LLP

(57) ABSTRACT

The present disclosure provides a power management apparatus, method and system. The apparatus comprises: a client management module for configuring power management client module(s) on one or more clients, the power management client module being for power management of the client; a data collector module for collecting, via the power management client module(s), data related to the power management of one or more user accounts on one or more clients; and a repository module for storing the collected data.

20 Claims, 3 Drawing Sheets

(56) References Cited

U.S. PATENT DOCUMENTS

| | | | |
|---|---|---|---|
| 2002/0099934 A1* | 7/2002 | Cromer | G06F 9/44505 713/2 |
| 2003/0005341 A1* | 1/2003 | Terunuma | G06F 1/28 713/310 |
| 2003/0009705 A1* | 1/2003 | Thelander | G06F 1/3203 713/340 |
| 2009/0049315 A1* | 2/2009 | Diab | H04L 12/10 713/310 |
| 2009/0077478 A1* | 3/2009 | Gillingham | H04L 41/0803 715/763 |
| 2009/0249051 A1* | 10/2009 | TeNgaio | G06F 9/455 713/1 |
| 2010/0115259 A1* | 5/2010 | Elsila | G06F 1/3203 713/100 |
| 2012/0204042 A1* | 8/2012 | Sistla | G06F 1/3206 713/310 |
| 2015/0089262 A1* | 3/2015 | Cairns | G06F 1/3203 713/323 |
| 2015/0100801 A1* | 4/2015 | Maity | G06F 1/3206 713/320 |

OTHER PUBLICATIONS

Rejection Decision issued in CN Application No. 201410135607.0 dated Mar. 5, 2019.

\* cited by examiner

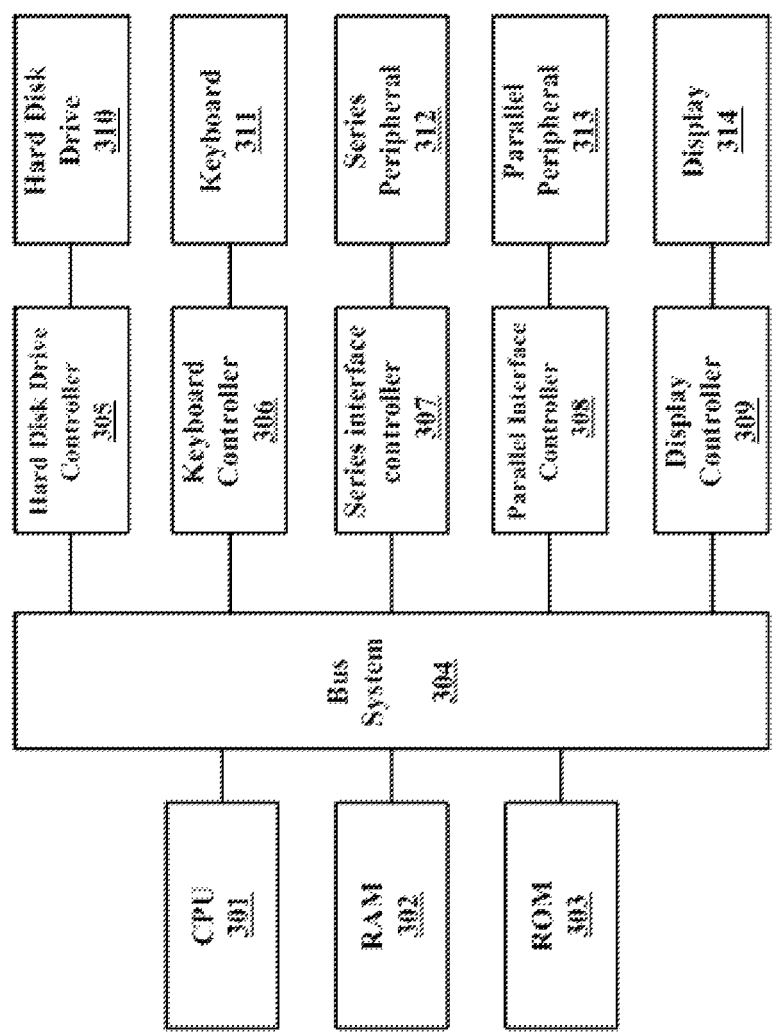

POWER MANAGEMENT

RELATED APPLICATION

This application claims priority from Chinese Patent Application Number CN201410135607.0 filed on Mar. 28, 2014 entitled "APPARATUS, METHOD AND SYSTEM FOR MANAGING POWER" the content and teachings of which is herein incorporated by reference in its entirety.

FILED OF DISCLOSURE

Embodiments of the present invention relate to the field of power management.

BACKGROUND OF THE DISCLOSURE

With popularization and development of computer technology, computer applications have spread across life and various industries. Under the popular use of computers, especially under the trend of environment sustainability, research in the field of computer power management has gradually increased. For example, there is always a need to conveniently switch a computer to standby mode whenever a user leaves the computer.

In response to this need, there are provided some traditional power management techniques. However, for an enterprise or an organization consisting of multiple clients, these traditional may in general fail because:

(1) The power management of an individual computer is typically solo managed that lacks of consistent tools and consensus standards. For example, the power management tools are variable from system to system, and the power policies usually depend on personal preference. One policy may be set to turn off monitor after 5 minutes computer idle; while another policy may be set to never turn off monitor regardless of the state of a computer.

(2) The short of a mechanism to monitor, measure and track energy consuming/saving in a centralized manner causes difficulties to statistics, reporting, recognizing and data analytics.

SUMMARY OF THE DISCLOSURE

To solve the above-described problems in the prior art, the present specification proposes a method, an apparatus and a computer program product for power management, and more specifically for power management in computer system.

BRIEF DESCRIPTION OF THE DRAWINGS

Through the detailed description of some embodiments of the present disclosure in the accompanying drawings, the features, advantages and other aspects of the present disclosure will become more apparent, wherein identical reference number normally refers to the same component.

FIG. 3 shows a block diagram of a computer system 300 which is applicable to implement the embodiments of the present invention.

DETAILED DESCRIPTION

Figure 1:
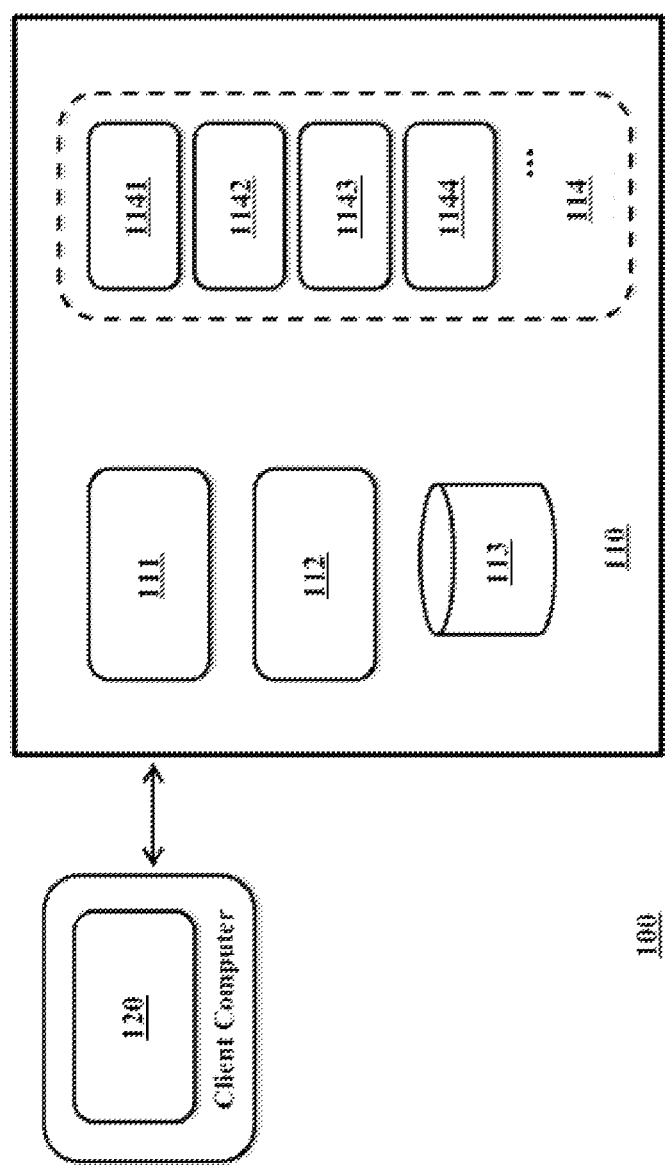
FIG. 1 shows a block diagram of a power management system 100 according to one exemplary embodiment of the present invention.

With reference to the accompanying drawings, more detailed description is presented below to preferred embodiments of the present disclosure. Although several preferred embodiments of the present disclosure are shown in the accompanying drawings, it should be understand the present disclosure may be implemented in various forms and should not be limited by the embodiments illustrated here. On the contrary, provision of these embodiments is only to make the present disclosure more thorough and complete and to convey the scope of the present disclosure to those skilled in the art.

According to a first aspect of the embodiments of the present disclosure, there may be provided a power management apparatus, comprising: a client management module for configuring power management client module(s) on one or more clients, the power management client module being for power management of the client; a data collector module for collecting, via the power management client module(s), data related to the power management of one or more user accounts on one or more clients; and a repository module for storing the collected data. Each of the client management module, the power management client module and the data collector module may be combined into a single power management module (not shown in the Figure), which may be configured to collectively perform the tasks of each of these individual modules.

In one optional implementation of the present disclosure, the apparatus further comprises at least one custom module, the custom module comprising: an analysis module for analyzing data stored in the repository module according to needs; a statistics/statistical module for making statistics on (generating statistical analysis) data stored in the repository module according to needs; and a reporting module for presenting needed information. Each of these custom modules, the analysis module, the statistics module and the reporting module can be further combined into the power management module, which may be configured to collectively perform the tasks of each of these individual modules.

In one optional implementation of the present disclosure, data stored in the repository module further comprises configuration information of the client which is collected by the client management module via the power management client module.

In one optional implementation of the present disclosure, the configuring power management client module(s) on one or more clients comprises: installing, managing or maintaining the power management client module(s) on the one or more clients.

In one optional implementation of the present disclosure, the power management comprises switching a computer of the client to power saving mode.

In one optional implementation of the present disclosure, the data is stored in correlation with the one or more user accounts.

According to a second aspect of the embodiments of the present disclosure, there is provided a power management method, comprising: configuring power management client module(s) on one or more clients, the power management client module being for power management of the client; collecting, via the power management client module(s), data related to the power management of one or more user accounts on one or more clients; and storing the collected data. As disclosed earlier, each of these separate modules may be combined into a single power management module.

According to a third aspect of the embodiments of the present disclosure, there is provided a system for power management, comprising: power management client module(s) installed on one or more clients for power management of the client; and a power management apparatus according to the first aspect of the present invention. As disclosed earlier, each of these separate modules may be combined into a single power management module.

FIG. 1 shows a block diagram of a power management system 100 according to one exemplary embodiment of the present invention. As shown in FIG. 1, power management system 100 according to one exemplary embodiment of the present invention may comprise a power management apparatus 110 and a power management client module 120. Power management client module 120 is installed on a client to manage power of the client. The power management mentioned in the present disclosure may be configured to save energy by reducing energy consumption when the computer is idle (for example, turning the computer to power saving mode or dormant mode). Those skilled in the art should understand each client has one power management client module 120 installed thereon; where there are a plurality of client computers, accordingly there are a plurality of power management client modules 120. Power management apparatus 110 is usually located on a stand-alone server to manage the plurality of power management client modules 120 in a centralized manner.

Power management apparatus 110 comprises a client management module 111 for configuring power management client module(s) 120 on one or more clients. As an example, power management apparatus 110 configuring power management client module 120 may comprise installing, managing or maintaining the power management client module(s) 120 on the one or more clients. For example, client management module 111 may push a relevant application to a client computer and remotely install the application on the client computer so as to create power management client module 120. In an implementation, power management client module 120 may integrate with other existing software management process and authentication/authorization control, for example install software on the client computer remotely. The type and version of an application may be adjusted on the basis of a target computer environment. The maintaining power management client module 120 may comprise operations like periodically updating power management client module 120. It may be observed that since power management client modules 120 on various client computers are under unified configuration and management of client management module 111, various power management client modules 120 have a good consistent power management policy.

Power management apparatus 110 further comprises a data collector module 112 for collecting, via power management client module(s) 120, power management related data of one or more user accounts on one or more clients. Optionally, the power management related data mentioned here includes, without limitation to, information on energy consumption of the client computer, and may vary on the basis of diverse application protocols of the power management client. For example, a Power Management Client that tracks the amount of energy that may be saved by manually switching a computer into low-energy model and querying to collect data about saved energy.

Power management apparatus 110 further comprises a repository module 113 for storing the collected data. Power management apparatus 110 may persist (store) collected data into repository module 113. Repository module 113 provides persisting capability to maintain the collected data or other related and/or required information. Interfaces are built to support necessary functions of storing, query, search and etc. Optionally but not necessarily, the collected data may be stored in correlation with a corresponding user account on a client. For example, where a plurality of users share one computer, the same client computer may contain a plurality of user accounts. At this point, there is a need to differentiate power management related data collected on this client comes from which user account, and data is stored in correlation with the corresponding user account.

It may be observed that power management apparatus 110 and system 120 according to one exemplary embodiment of the present disclosure enables an enterprise or another organization to maintain a consistent policy of power management crossing variable computers and thus achieve consistent power management.

Returning to FIG. 1, in an optional embodiment, power management apparatus 110 may further comprise at least one custom module 114. Custom module 114 may be defined by a user and provides user needed supplemental functions by making reference to data stored in repository module 113. Those skilled in the art should understand that custom module 114 is not essential and does not limit the scope of the present disclosure. As an example, custom module 114 may comprise one of more of: an analysis module 1041 for analyzing data stored in the repository module according to (e.g. user) needs; a statistics module 1042 for making/generating statistics on data stored in the repository module according to (e.g. user) needs; and a reporting module 1043 for presenting needed information (e.g. to the user). In addition, the custom module may also comprise a tracking module 1044 for tracking energy consumption etc.

Optionally, client management module 111 may additionally collect configuration information of a client via power management client module 120, such as software and hardware configuration information on CPU, Operating System, memory and the like. The information may also be stored in repository module 113 by client management module 111 for subsequent access. After additionally obtaining configuration information of the client, modules such as modules 1042 and 1043 may further measure the amount of energy saved by this client, thereby forming more quantized information.

With reference to FIG. 1, the process of tracking, in a unified manner, energy saving behavior of individual computers by using system 100 is described below.

1. Client management module 101 configures (e.g. Installs) power management client modules 120 on a plurality of client computers, which may be implemented using existing IT solutions like authentication, push software. Note that power management client module 120 may comprise various types or versions that are suitable for different computer platforms/OSs and may be changed to be applicable to various types of computers. In addition, power management client module 120 may further be designed such that by interacting with it (e.g., single click a button), a user may immediately switch the computer into low-energy model.

2. The user interacts with power management client module 120, for example by click of a button, to switch the computer to low-energy model whenever he/she thinks it is necessary.

3. Data collector module 102 interacts with power management client module 120 to collect client data, such as how often a certain user on the client switches to low-energy model actively; how long the computer is kept in low-energy model; etc. Alternatively, client management module 101 may also interact with power management client module 120 to collect the client's configuration information, such as software and hardware configuration information on CPU, Operating System and memory.

4. All collected data or information may be correlated with other metadata optionally. The metadata comprises user information or user account information and may be persisted into repository module 113.

5. Subsequently, some custom modules 114 provide more advanced service by consuming data stored in repository module 113. For example, statistics module 1043 is able to determine which user performs power management most actively among all users for a given client or for a group of clients or in general amongst all the clients. Analysis module 1042 may analyze that amount of energy saved by the user on the client on the basis of the client's configuration information and power management related data. Reporting module 1041 may provide a graphical representation of the amounts of saved energy to the user in a presentable form as desired.

That is, by the above various exemplary implementations of the present disclosure, not only unified power management of a plurality of clients is enabled, but also power management by various users may be learned by processing information like power management data collected from various clients. Thereby, an incentive may be offered to a user performing power management, and/or power management policies may be adjusted in a unified manner for achieving superior power management, etc.

It should be noted here that each of the separate modules described above may be advantageously combined into a single power management module and the power management module can collectively perform the tasks associated to each of the individual modules in a desired order or predefined order to achieve the end result of better power management.

Figure 2:
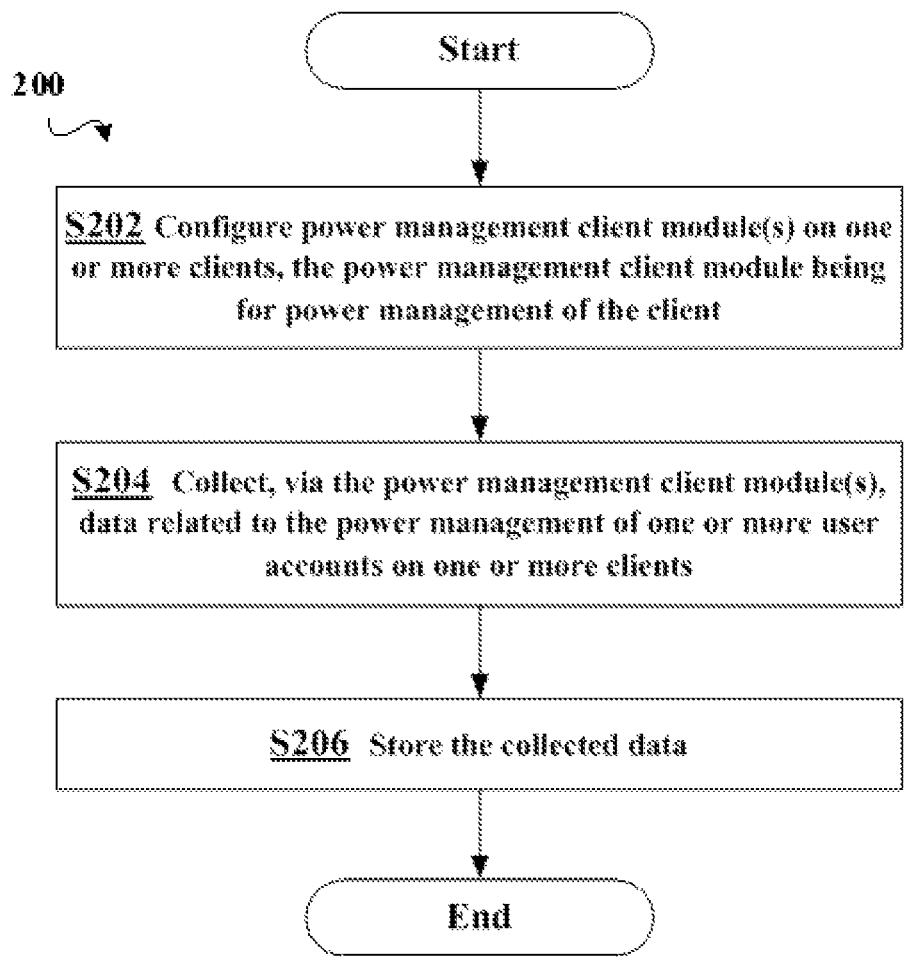
FIG. 2 shows a flowchart of a power management method 200 according to one exemplary embodiment of the present invention.

FIG. 2 shows a flowchart of a power management method 200 according to one exemplary embodiment of the present disclosure.

After method 200 starts, the flow first proceeds to step S202 of configuring power management client module(s) on one or more clients, the power management client module being for power management of the client.

Then method 200 proceeds to step S204 of collecting, via the power management client module(s), data related to the power management of one or more user accounts on the one or more clients.

Method 200 proceeds to step S206 of storing the collected data.

Optionally, method 200 may further comprise at least one of: analyzing the stored data according to needs; making/generating statistics on the stored data according to needs, such as user needs or organization needs or clients' needs etc.; and presenting required information to a user as desired by the user.

In one optional implementation of the present disclosure, the stored data further comprises configuration information of the client which is collected via the power management client module.

In one optional implementation of the present disclosure, the configuring power management client module(s) on one or more clients comprises: installing, managing or maintaining the power management client module(s) on the one or more clients.

In one optional implementation of the present disclosure, the power management comprises switching a computer of the client to power saving mode.

In one optional implementation of the present disclosure, the data is stored in correlation with the one or more user accounts.

Method 200 ends.

FIG. 3 shows an exemplary block diagram of a computer system which is applicable to implement the embodiments of the present disclosure. As shown in FIG. 3, the computer system includes: a CPU (Central Processing Unit) 301, a RAM (Random Access Memory) 302, a ROM (Read Only Memory) 303, a system bus 304, a hard disk controller 305, a keyboard controller 306, a serial interface controller 307, a parallel interface controller 308, a monitor controller 309, a hard disk 310, a keyboard 311, a serial peripheral device 312, a parallel peripheral device 313 and a monitor 314. Among these devices, connected to the system bus 304 are the CPU 301, the RAM 302, the ROM 303, the hard disk controller 305, the keyboard controller 306, the serial interface controller 307, the parallel interface controller 308 and the monitor controller 309. The hard disk 310 is coupled to the hard disk controller 305; the keyboard 311 is coupled to the keyboard controller 306; the serial peripheral device 312 is coupled to the serial interface controller 307; and the parallel peripheral device 313 is coupled to the parallel interface controller 308; and the monitor 314 is coupled to the monitor controller 309.

It should be understood that the structural block diagram in FIG. 3 is shown only for illustration purpose, and is not intended to limit the scope of the present disclosure. In some cases, some devices may be added or reduced as required.

In particular, besides hardware embodiments, the embodiments of the present disclosure may also be implemented in a form of a computer program product. For example, apparatus 110 as described with reference to FIG. 1 and method 200 as described with reference to FIG. 2 may be implemented via a computer program product. This computer program product may be stored in RAM 302, ROM 303, hard disk 310 and/or any suitable storage medium as illustrated in FIG. 3, or downloaded to computer system 300 from a suitable location in the network. The computer program product may comprise computer code portions comprising program instructions that may be executed through a suitable processing device (for example, CPU 301 as shown in FIG. 3). The program instruction at least may comprise: an instruction for configuring power management client module(s) on one or more clients, the power management client module being for power management of the client; an instruction for collecting, via the power management client module(s), data related to the power management of one or more user accounts on the one or more clients; and an instruction for storing the collected data.

The spirit and principle of the present disclosure have been illustrated by means of several concrete embodiments. According to the embodiments of the present disclosure, a consistent power management policy is enabled by means of centralized power management of various clients; by performing operations like analysis, statistics, tracking and reporting to the collected data related to power management, much deeper information can be obtained and more advanced services can be provided.

It should be noted that, the embodiments of the present disclosure can be implemented in software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present invention may be implemented by hardware circuitry of a very large scale integrated circuit or gate array, a semiconductor such as logical chip or transistor, or a programmable hardware device such as a field-programmable gate array or a programmable logical device, or implemented by software executed by various kinds of processors, or implemented by combination of the above hardware circuitry and software such as firmware.

The communication network as mentioned in this specification may comprise various kinds of networks, including but not limited to local area network (LAN), wide area network (WAN), an IP-protocol based network (for example Internet), and a peer-to-peer network (for example ad hoc peer network).

It should be noted that although a plurality of units or subunits of the apparatuses have been mentioned in the above detailed depiction, such partitioning is merely non-compulsory. In actuality, according to the embodiments of the present disclosure, the features and functions of two or more units above described may be embodied in one unit. On the contrary, the features and functions of one unit above described may be further partitioned to be embodied in more units.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. A power management apparatus, comprising:
    a power management module, on a computing device, for configuring power management on one or more clients separate from the computing device,
    a data collector module configured for collecting data, via the power management module, related to the power management of one or more user accounts on the one or more clients, wherein the data collector module is further configured for:
        analyzing an amount of energy saved by the one or more users on the one or more clients based on configuration information of the one or more clients;
        managing power usage of each of the one or more clients based on information related to the collected data, wherein the collected data includes software configuration information and hardware configuration information relating to each of the one or more clients; and
        providing a subset of the collected data to the one or more users associated with the one or more user accounts; and
    a client management module, on the computing device, for configuring the power management module on the one or more clients, wherein configuring the power management module comprises maintaining the power management module on the one or more clients by periodically updating the power management module;
    a one-click utility configured to allow the one or more users to manage power usage associated with the one or more user accounts; and
    a repository module configured for storing the collected data.

2. The apparatus according to claim 1, further comprising at least one custom module, wherein the at least one custom module comprises:
    an analysis module, on the computing device, configured for analyzing data stored in the repository module according to the one or more user's needs;
    a statistical module, on the computing device, configured for making statistics on data stored in the repository module according to the one or more user's needs;
    a reporting module, on the computing device, configured for presenting information to the one or more user as desired; and
    a tracking module, on the computing device, configured for tracking energy consumption.

3. The apparatus according to claim 2, wherein the data stored in the repository module comprises the configuration information of the one or more clients.

4. The apparatus according to claim 1, further configured for wherein configuring the power management module further comprises:
    installing and managing the power management module on the one or more clients.

5. The apparatus according to claim 1, wherein the power management comprises switching a computer of the one or more clients to a power saving mode.

6. The apparatus according to claim 1, wherein the data is stored in correlation with the one or more user accounts.

7. A power management method, comprising:
    configuring, from a computing device, a power management module on one or more clients, separate from the computing device, for power management of the one or more clients;
    providing a one-click utility configured to allow one or more users to manage power usage associated with one or more user accounts;
    collecting, via the power management module, data related to the power management of the one or more user accounts on the one or more clients, wherein collecting data includes:
        analyzing an amount of energy saved by the one or more users on the one or more clients based on configuration information of the one or more clients;
        managing power usage of each of the one or more clients based on information related to the collected data, wherein the collected data includes software configuration information and hardware configuration information relating to each of the one or more clients; and
        providing a subset of the collected data to the one or more users associated with the one or more user accounts; and
    configuring, from the computing device, a client management module for configuring the power management module on the one or more clients, wherein configuring the power management module comprises maintaining the power management module on the one or more clients by periodically updating the power management module;
    storing, via a repository module, the collected data.

8. The method according to claim 7, further comprising at least one custom module, wherein the at least one custom module is configured for:
- analyzing, via an analysis module, on the computing device, the stored data according to the needs of the one or more users;
- making statistics, via a statistical module, on the computing device, on the data stored in the repository module according to the needs of the one or more users; and
- presenting information, via a reporting module, on the computing device, to the one or more users as desired; and
- tracking, via a tracking module, on the computing device, energy consumption.

9. The method according to claim 8, wherein the data stored in the repository module comprises the configuration information of the one or more clients.

10. The method according to claim 7, wherein configuring the power management module further comprises further comprises:
- installing and managing the power management module on the one or more clients.

11. The method according to claim 7, wherein the power management comprises switching a computer of the one or more clients to a power saving mode.

12. The method according to claim 7, wherein the data is stored in correlation with the one or more user accounts.

13. A system for power management, comprising:
- a power management module installed on one or more clients, by a power management apparatus on a computing device, for power management of the one or more clients, separate from the computing device, configured by the power management apparatus for collecting data, via a data collector module, related to the power management of one or more user accounts on the one or more clients, wherein collecting data related to the power management of the one or more user accounts on the one or more clients comprises:
  - analyzing an amount of energy saved by the one or more users on the one or more clients based on configuration information of the one or more clients;
  - managing power usage of each of the one or more clients based on information related to the collected data, wherein the collected data includes software configuration information and hardware configuration information relating to each of the one or more clients; and
  - providing a subset of the collected data to the one or more users associated with the one or more user accounts; and
- a client management module, on the computing device, for configuring the power management module on the one or more clients, wherein configuring the power management module comprises maintaining the power management module on the one or more clients by periodically updating the power management module;
- providing a one-click utility to allow the one or more users to manage power usage associated with one or more user accounts; and
- storing, via a repository module, the collected data.

14. The system according to claim 13, further comprising at least one custom module, wherein the at least one custom module is configured for:
- analyzing, via an analysis module, on the computing device, the data stored in the repository module according to the needs of the one or more users;
- making statistics, via a statistical module, on the computing device, on the data stored in the repository module according to the needs of the one or more users;
- presenting information, via a reporting module, on the computing device, to the one or more users as desired; and
- tracking, via a tracking module, on the computing device, energy consumption.

15. The system according to claim 14, wherein the data stored in the repository module comprises the configuration information of the one or more clients.

16. The system according to claim 13, further configured for:
- installing and managing the power management module on the one or more clients.

17. The system according to claim 13, wherein the power management comprises switching a computer of the one or more clients to a power saving mode.

18. The system according to claim 13, wherein the data is stored in correlation with the one or more user accounts.

19. The apparatus according to claim 1, wherein the collected data comprises a frequency at which the one or more user accounts on the one or more clients actively switches to a low-energy model and a length of time at which the low-energy model is used by the one or more user accounts.

20. The method according to claim 7, wherein the collected data comprises a frequency at which the one or more user accounts on the one or more clients actively switches to a low-energy model and a length of time at which the low-energy model is used by the one or more user accounts.

* * * * *